(12) United States Patent
Xu et al.

(10) Patent No.: US 12,019,170 B1
(45) Date of Patent: Jun. 25, 2024

(54) GNSS AND INS INTEGRATED NAVIGATION POSITIONING METHOD AND SYSTEM THEREOF

(71) Applicant: SHANDONG UNIVERSITY OF SCIENCE AND TECHNOLOGY, Qingdao (CN)

(72) Inventors: Ying Xu, Qingdao (CN); Kun Wang, Qingdao (CN); Jinjie Sun, Qingdao (CN); Yuqing Feng, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/496,789

(22) Filed: Oct. 27, 2023

(30) Foreign Application Priority Data

May 6, 2023 (CN) .......................... 202310497599.3

(51) Int. Cl.
*G01S 19/39* (2010.01)
*G01S 19/40* (2010.01)
(Continued)

(52) U.S. Cl.
CPC ............ *G01S 19/393* (2019.08); *G01S 19/40* (2013.01); *G01S 19/49* (2013.01); *G01S 19/52* (2013.01)

(58) Field of Classification Search
CPC ........ G01S 19/393; G01S 19/40; G01S 19/47; G01S 19/49; G01S 19/52; G01S 19/53
See application file for complete search history.

(56) References Cited

U.S. PATENT DOCUMENTS 8,756,001 B2* 6/2014 Georgy .................. G01S 19/47
701/472
11,821,729 B2* 11/2023 Zhao ...................... G06N 3/084
(Continued)

FOREIGN PATENT DOCUMENTS

CN 103149580 A 6/2013
CN 104898148 A 9/2015
(Continued)

OTHER PUBLICATIONS

Xu, Y.; Wang, K.; Jiang, C.; Li, Z.; Yang, C.; Liu, D.; Zhang, H. Motion-Constrained GNSS/INS Integrated Navigation Method Based on BP Neural Network. Remote Sens. 2023, 15, 154. Published Dec. 27, 2022 https://doi.org/ 10.3390/rs15010154 (Year: 2022).*
(Continued)

*Primary Examiner* — Cassi J Galt

(57) ABSTRACT

The present disclosure relates to the field of GNSS and INS integrated navigation technology, and specifically discloses a GNSS and INS integrated navigation positioning method and a system thereof. To addresses the technical problem of positioning error divergence in integrated navigation systems caused by insufficient satellite visibility or strong multipath effects in GNSS denial environments, a method combining motion constraint algorithm and neural network algorithm is proposed for robustness by the present disclosure. The motion constraint algorithm is very stable, but it cannot self-adaptively adjust the constraint threshold based on the vehicle motion state. The neural network algorithm has strong flexibility, but the obtained predicted values inevitably have outliers. The present disclosure combines motion constraints with the neural network algorithms, enabling these two algorithms to complement advantages of each other, thereby effectively improving the positioning
(Continued)

accuracy and reliability of the integrated navigation system after GNSS losing lock.

6 Claims, 2 Drawing Sheets

(51) Int. Cl.
*G01S 19/49* (2010.01)
*G01S 19/52* (2010.01)

(56) References Cited

U.S. PATENT DOCUMENTS

| | | | |
|---|---|---|---|
| 2007/0222674 A1 | 9/2007 | Tan et al. | |
| 2014/0180579 A1* | 6/2014 | Friend | G01S 19/48 |
| | | | 701/518 |

FOREIGN PATENT DOCUMENTS

| | | | |
|---|---|---|---|
| CN | 109945860 A | 6/2019 | |
| CN | 110487271 A | 11/2019 | |
| CN | 111290007 A | 6/2020 | |
| CN | 112505737 A | 3/2021 | |
| CN | 114216459 A | 3/2022 | |
| CN | 114674313 A | 6/2022 | |
| WO | WO-2023166536 A1 * | 9/2023 | |

OTHER PUBLICATIONS

Kong, D.; Wen, W.; Zhao, R.; Lv, Z.; Liu, K.; Liu, Y.; Gao, Z. Vehicle Lateral Velocity Estimation Based on Long Short-Term Memory Network. World Electr. Veh. J. 2022, 13, 1. https://doi.org/10.3390/wevj13010001 (Year: 2022).*

Zhou, Yimin et. al., "GPS/INS Integrated Navigation with BP Neural Network and Kalman Filter", Proceedings of the 2017 IEEE International Conference on Robotics and Biomimetics, Dec. 5-8, 2017 (Year: 2017).*

Chen Xinxin, Zhang Fuchun, Hao Yanzhong, "Study on GPS/INS integrated navigation filtering algorithm asststed by neural network", Electronic Technology Applications, No. 5, pp. 84-87.

Wang Fu et al., "Research on GNSS/INS Integrated Navigation Algorithm in complex Urban Environments", Geodesy and Geodynamics, Jan. 31, 2022, vol. 42, No. 1, pp. 15-20.

* cited by examiner

GNSS AND INS INTEGRATED NAVIGATION POSITIONING METHOD AND SYSTEM THEREOF

CROSS-REFERENCE TO RELATED APPLICATIONS

This application claims priority to Chinese Application No. 202310497599.3, filed on May 6, 2023, entitled "GNSS AND INS INTEGRATED NAVIGATION POSITIONING METHOD AND SYSTEM THEREOF". These contents are hereby incorporated by reference.

TECHNICAL FIELD

The present disclosure relates to the field of integrated navigation technology, in particular to a GNSS and INS integrated navigation positioning method and system thereof.

BACKGROUND

Inertial navigation system (INS) has the advantages of complete autonomy, fast refresh rate, and high short-term navigation accuracy. However, the positioning error of INS will accumulate and increase over time. At present, combining the inertial navigation system (INS) with the global navigation satellite system (GNSS) is one of the most common integrated navigation methods. The two navigation methods complement each other and provide high-precision navigation and positioning information continuously when the GNSS signal is good. However, when vehicles are in a complex environment such as urban canyon, GNSS positioning is susceptible to the influence of complex urban environments such as high-rise buildings, elevated buildings, and shaded tunnels, resulting in signal obstruction or strong multipath effects, leading to GNSS losing lock, so that the GNSS and INS integrated navigation system cannot provide accurate, continuous, and reliable position and velocity information.

Therefore, improving the positioning accuracy and reliability of the GNSS and INS integrated navigation system (especially the low-cost GNSS/MEMS_IMU integrated navigation system) after GNSS losing lock has become an urgent problem to be solved.

There are currently three main solutions to the problem of INS positioning error rapidly diverging after GNSS losing lock.

The first method is to use auxiliary sensors external to the GNSS/INS integrated navigation system, such as magnetometers, odometers, and barometers. The information from these external sensors can improve the overall robustness and positioning accuracy of the GNSS/INS integrated navigation system.

The second method is to construct a motion constraint model based on the inherent motion laws of the vehicle. The core idea of this method is to convert the prior information of vehicle motion into measured values, and then incorporate them into the updated filter for measurement. The commonly used vehicle motion constraint algorithms include elevation constraint, velocity constraint, and attitude constraint.

The third method is to use artificial neural networks (ANN) algorithm to study the robustness of GNSS/INS integrated navigation system after GNSS losing lock. The ANN algorithm has excellent results in predicting nonlinear systems, and using artificial neural network algorithms to improve the positioning accuracy when GNSS losing lock occurs is a feasible method. Many researchers have constructed various neural networks for INS assisted measurement models when GNSS losing lock occurs.

However, the above three solutions all have shortcomings, which are reflected in the following aspects:

When GNSS losing lock occurs, the use of additional auxiliary sensors can effectively improve the navigation and positioning accuracy of the GNSS/INS integrated navigation system. However, adding auxiliary sensors will also increase the overall cost and complexity of the integrated navigation system.

Motion constraint algorithms can improve the positioning accuracy and reliability of integrated navigation systems without using external sensors. However, existing motion constraint algorithms often use fixed constraint values, which are very stable, but cannot achieve self-adaptive adjustment of constraint values based on the actual motion state of the vehicle.

Compared to motion constraint algorithms, the use of neural network algorithms is more flexible. Although the introduction of neural network algorithms can effectively improve the positioning accuracy and reliability of the GNSS/INS integrated navigation system when GNSS losing lock occurs, the neural network algorithm inevitably encounters outliers, and the real-time performance of the neural network algorithm solution also needs to be considered.

SUMMARY

The objective of the present disclosure is to provide a GNSS and INS integrated navigation positioning method, which effectively improves the positioning accuracy and reliability of the GNSS and INS integrated navigation system after GNSS losing lock by improving the motion constraint algorithm and BP neural network algorithm, and combining the two algorithms for complementary advantages.

In order to achieve the above objectives, the present disclosure adopts the following technical solution:

A GNSS and INS integrated navigation positioning method, including the following steps:

Step 1, constructing a BP neural network, using a forward velocity of vehicle within one window period and a heading angular velocity measured by IMU during a normal combination solution calculation of GNSS and INS integrated navigation system as inputs to the BP neural network, and using a transverse velocity of the vehicle within one window cycle as outputs of the BP neural network to train the constructed BP neural network, so as to obtain a trained BP neural network fitting model at an end of training;

Step 2, using the trained BP neural network fitting model to predict a transverse velocity of the vehicle at the current time based on a forward velocity instantaneously calculated by the inertial navigation system (INS) and an angular velocity measured by IMU when GNSS losing lock occurs;

Based on a current motion state of the vehicle, providing a transverse velocity constraint formula for a corresponding motion state, applying constraints to a predicted transverse velocity of the vehicle to obtain a constrained transverse velocity, and using the constrained transverse velocity as a velocity observation value in an odometer/nonholonomic constraint, combing with the forward velocity and elevation velocity constraints of the odometer to form a three-dimensional velocity observation vector.

Using the velocity observation value in the odometer/the nonholonomic constraint as an auxiliary source with errors input to a Kalman filter, and inputting an INS measured velocity to the Kalman filter, wherein an odometer/nonholonomic constrained velocity is used as a measurement vector, and the INS measured velocity is used as a state vector; conducting a measurement update process of extended Kalman filtering based on the odometer/the nonholonomic constraint.

Obtaining an error correction value of the velocity after filtering is completed, correcting a velocity error to obtain a corrected three-dimensional velocity; finally updating a position error by using of the corrected three-dimensional velocity to obtain navigation positioning results.

In addition, on the basis of the GNSS and INS integrated navigation positioning method, the present disclosure also provides a corresponding GNSS and INS integrated navigation positioning system, which adopts the following technical solution:

- A GNSS and INS integrated navigation positioning system, including a GNSS antenna, a GNSS data processing module, an IMU sensor, a central processing unit, and a PC control terminal;
- Wherein, the GNSS antenna is connected to the GNSS data processing module, and the IMU sensor is connected to the central processing unit;
- The GNSS data processing module and the central processing unit are respectively connected to the PC control terminal;
- The PC control terminal comprises a memory and one or more processors;
- The memory stores an executable code, and the processor executes the executable code for implementing the steps the GNSS and INS integrated navigation positioning method as mentioned above.

The present disclosure has the following advantages:

As mentioned above, the present disclosure provides a GNSS and INS integrated navigation positioning method and a system thereof. The integrated navigation positioning method introduces the BP neural network algorithm to construct a BP neural network fitting model for transverse velocity that takes into account changes in vehicle forward velocity and vehicle heading angular velocity. At the same time, the motion constraint algorithm is used to obtain the transverse velocity changes of the vehicle under different motion states, thereby improving the effectiveness of the motion constraint (especially velocity constraint) algorithm. By combining the above two algorithms, advantages are complementary, it is beneficial to improve the positioning accuracy of the GNSS and INS integrated navigation system after GNSS losing lock, and also solves the problem of inaccurate transverse velocity constraint parameters in the combination method of GNSS_INS_OD_NHC.

DETAILED DESCRIPTION OF THE EMBODIMENTS

In order to better understand the objectives, features, and advantages of the present invention, the present invention is described below in further detail with reference to the accompanying drawings and specific implementations.

Figure 1:
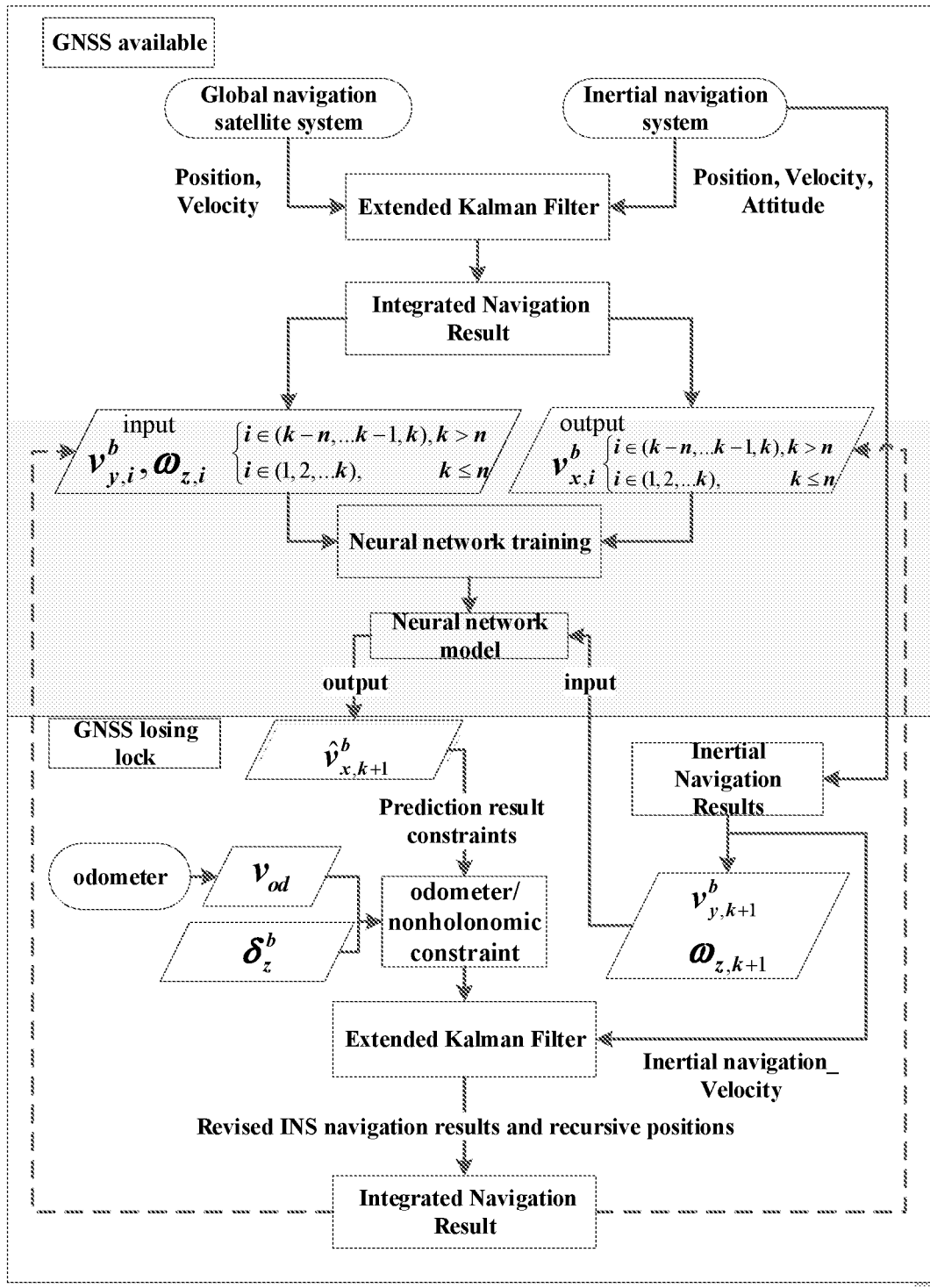
FIG. 1 is a flowchart of the GNSS and INS integrated navigation positioning method in the embodiment of the present disclosure.

As shown in FIG. 1, a GNSS and INS integrated navigation positioning method is provided in the present embodiment, which includes the steps as shown below.

Step 1, constructing a BP neural network, using a forward velocity of vehicle within one window period and a heading angular velocity measured by IMU during a normal combination solution calculation of a GNSS and INS integrated navigation system as inputs to the BP neural network, and using a transverse velocity of the vehicle within one window cycle as outputs of the BP neural network to train the constructed BP neural network, so as to obtain a trained BP neural network fitting model at an end of training.

In vehicle motion constraint algorithms, reasonable configuration of related constraint parameters can effectively improve the positioning performance of the algorithm. Currently, The INS_NHC_OD algorithm still has the problem of inaccurate transverse velocity constraint parameters, and the existing neural network-based transverse velocity fitting models have not thoroughly studied the relationship between transverse velocity changes and vehicle motion status during vehicle driving, and the mapping relationship of neural network models is not clear enough. Based on this, the present disclosure provides a neural network transverse velocity fitting method that takes into account vehicle forward velocity and vehicle heading angular velocity. By constructing a BP neural network fitting model that takes into account vehicle forward velocity changes and vehicle heading angular velocity changes, a more accurate transverse velocity can be predicted after GNSS failure to improve the navigation and positioning accuracy of the system.

Specifically, when GNSS is working normally, the forward velocity and the heading angular velocity vectors of the vehicle calculated by the GNSS and INS integrated navigation system within one window period are used as input layer data of the BP neural network, and the transverse velocity of the vehicle within one window period is used as output layer data of the BP neural network;

Wherein, the input layer data of the BP neural network is shown in formula (1):

$$x_{input} = \begin{bmatrix} v_{y,1}^b & w_{z,1} \\ ... & ... \\ v_{y,n-1}^b & w_{z,n-1} \\ v_{y,n}^b & w_{z,n} \end{bmatrix} \quad (1)$$

In the formula, $x_{input}$ is an input of the BP neural network. $x_{input}$ contains the forward velocity $v_{y,i}^b$ of the vehicle and the heading angular velocity $\omega_{z,i}$ within one window period, i represents a solution time of the GNSS and INS integrated navigation system, i=[1,n], and n represents the n-th solution time.

Wherein, the output layer data of the BP neural network is shown in formula (2):

$$y_{output} = \begin{bmatrix} v_{x,1}^b \\ ... \\ v_{x,n-1}^b \\ v_{x,n}^b \end{bmatrix} \quad (2)$$

In the formula, $y_{output}$ is an output of the BP neural network, containing the transverse velocity of the vehicle within one window period.

The parameters of the BP neural network are set as follows: a number of a hidden layer is 2, a maximum number of training iterations is 300, an initial learning rate is 0.01, and a training method adopts gradient descent method; a training process of the BP neural network is as follows:

$x_{input}$ is the input of the neural network, the forward velocity and the heading angular velocity $\omega_{z,i}$ of the vehicle at the i-th solution time, giving weight values and bias terms from an input layer to the hidden layer and weight values and bias terms from the hidden layer to an output layer.

During the training process, the forward velocity and the heading angular velocity of the vehicle are used as input values of the hidden layer, multiplied by the weight values from the input layer to the hidden layer at time i respectively, and bias terms are added to obtain intermediate variables of the hidden layer.

The values obtain from the intermediate variables of the hidden layer calculated by an excitation function are used as output values of the hidden layer.

The output values calculated from the forward velocity and the heading angular velocity of the vehicle are used as input values of the output layer, multiplied by the weight values from the hidden layer to the output layer at time i, and the bias terms from the hidden layer to the output layer are added to obtain intermediate variables of the output layer.

Using the value $y_{output}$ calculated by the excitation function of the intermediate variables of the output layer as output values of the BP neural network.

Step 2, using the trained BP neural network fitting model to predict a transverse velocity of the vehicle at the current time based on a forward velocity instantaneously calculated by the inertial navigation system (INS) and an angular velocity measured by IMU when GNSS losing lock occurs.

Providing a transverse velocity constraint formula for a corresponding motion state based on a current motion state of the vehicle, applying constraints to a predicted transverse velocity of the vehicle to obtain a constrained transverse velocity, and using the constrained transverse velocity as a velocity observation value in an odometer/nonholonomic constraint, combing with the forward velocity and elevation velocity constraints of the odometer to form a three-dimensional velocity observation vector.

Using the velocity observation value in the odometer/the nonholonomic constraint as an auxiliary source with errors input to a Kalman filter, and inputting an INS measured velocity to the Kalman filter, wherein an odometer/nonholonomic constrained velocity is used as a measurement vector, and the INS measured velocity is used as a state vector. A measurement update process of extended Kalman filtering is conducted based on the odometer/the nonholonomic constraint.

Obtaining an error correction value of the velocity after filtering is completed, correcting a velocity error to obtain a corrected three-dimensional velocity. Finally updating a position error by using of the corrected three-dimensional velocity to obtain navigation positioning results.

The specifically, the heading angular velocity of the vehicle measured by IMU and the forward velocity of the vehicle calculated by INS are substituted into the trained BP neural network fitting model to predict a pseudo measured value $\hat{v}_x^b$ of the transverse velocity of the vehicle at the time when GNSS losing lock occurs.

Combining the pseudo measured value of the predicted transverse velocity of the vehicle with the forward velocity and the elevation velocity constraints of the odometer to form a three-dimensional velocity observation vector $[\hat{v}_x^b, v_{od} 0]$, wherein $v_{od}$ represents the forward velocity output by the vehicle.

At this point, the classic odometer/nonholonomic constraint, namely OD/NHC observation vector $v_{od/nhc}^b = [\delta_x^b\ v_{od}\ \delta_z^b]^T$ is rewritten as:

$$v_{od/nhc}^b = \begin{bmatrix} \hat{v}_x^b & v_{od} & \delta_z^b \end{bmatrix}^T \quad (3)$$

In the formula, $v_{od/nhc}^b$ is a velocity of the vehicle when using the OD/NHC algorithm; $\delta_x^b$ and $\delta_z^b$ are a transverse velocity observation error and a normal velocity observation error of the measured values of sensors installed on the vehicle in a vehicle coordinate system, respectively.

Due to the inevitable occurrence of outliers in neural network system, it is necessary to constrain the pseudo measured values of vehicle transverse velocity output by the BP neural network fitting model, so as to prevent the constraint effect from deteriorating due to excessive predicted values.

The maximum constraint threshold of the constraint equation varies depending on the motion state of the vehicle. For example, when the vehicle is turning, its transverse velocity will increase, and the constraint threshold should be appropriately enlarged. When the vehicle is traveling in a straight line, the constraint threshold needs to be appropriately reduced.

For unmanned vehicles, considering the need for lane level positioning, vehicle lane changing, large arc section driving, and vehicle turning are considered as non straight line driving, and straight line driving and small swing of the vehicle are considered as straight line driving.

The present disclosure performs vehicle turning detection and judgment through the following formulas.

If a following formula (4) is met, the vehicle is determined to be turning, otherwise it is determined to be going straight;

$$\begin{cases} \omega_z > \lambda_1, v_y^b \leq v_1 \\ \omega_z > \lambda_2, v_1 < v_y^b \leq v_2 \\ \omega_z > \lambda_3, v_2 < v_y^b \leq v_3 \\ \omega_z > \lambda_4, v_3 < v_y^b \end{cases} \quad (4)$$

In the formula, $\omega_z$ is the heading angular velocity of the vehicle, and $v_y^b$ is the forward velocity of the vehicle.

$\lambda_j$ is an angular velocity change threshold, wherein j=[1, 4], and j represents four set of the angular velocity change thresholds. In this embodiment, $\lambda_1=2.0$, $\lambda_2=1.5$, $\lambda_3=1.0$, $\lambda_4=0.7$, unit: o/s.

$v_t$ is an forward velocity change threshold, t=[1,3], and t represents three set of the forward velocity change thresholds. In this embodiment, $v_1=5.0$, $v_2=10.0$, $v_3=13.0$, unit: m/s.

The transverse velocity constraint formula for the current vehicle in the corresponding motion state is given as below.

When the vehicle is determined to be traveling straight, a constraint formula of the transverse velocity of the vehicle is as follows:

$$\begin{cases} \hat{v}_x^b = \hat{v}_x^b, \hat{v}_x^b \leq 3\delta_x^b \\ \hat{v}_x^b = 3\delta_x^b, \hat{v}_x^b > 3\delta_x^b \end{cases} \quad (5)$$

When the vehicle is determined to be turning, a constraint formula of the transverse velocity of is as follows:

$$\begin{cases} \hat{v}_x^b = \tilde{v}_x^b, & \tilde{v}_x^b \leq 6\delta_x^b \\ \hat{v}_x^b = 6\delta_x^b, & \tilde{v}_x^b > 6\delta_x^b \end{cases} \quad (6)$$

The corresponding transverse velocity constraint formulas is given based on the motion state of the vehicle, then, applying constraints to the transverse velocity of the vehicle at the current time predicted by the BP neural network fitting model.

After obtaining the transverse velocity value of the vehicle after the constraint is applied, the transverse velocity value of the vehicle is used as the velocity observation value $\hat{v}_x^b$ in the odometer/nonholonomic constraint formula (3) for extended Kalman filtering update;

The updating process of the measurements based on extended Kalman filtering with the odometer/nonholonomic constraint is more conventional and is roughly as follows:

Step 2.1. Prediction of state vector.

Using the INS measured velocity at the previous moment and the state transition matrix to predict the current INS velocity.

Step 2.2. Prediction of state vector covariance.

based on the covariance propagation rate, calculating the covariance matrix of the current INS measured velocity using the covariance matrix of the INS measured velocity at the previous moment and the covariance matrix of the INS system noise.

Step 2.3. Calculation of gain matrix.

Calculating the gain using the covariance matrix of INS velocity calculated in step 2.2, the covariance matrix of measured noise for the odometer/nonholonomic constrained velocity, and the coefficient matrix.

Step 2.4. Update of state measurement.

the difference between the INS measured velocity at the previous moment and the product of the odometer/nonholonomic constraint velocity and coefficient matrix, the gain calculated in step 2.3, and the INS measured velocity at the previous moment are used to calculate the corrected INS velocity at the current moment.

Step 2.5. Update of covariance matrix.

Updating the covariance matrix of the INS velocity at the current time calculated in step 2.2 and the gain calculated in step 2.3 to update the covariance matrix of the INS.

After the completion of extended Kalman filtering, the error correction values δp' and δv' of the vehicle position and the vehicle velocity at the time that GNSS losing lock occurs are obtained. The position and the velocity in the navigation results are obtained by the following methods:

$$\begin{bmatrix} p_E \\ p_N \\ p_U \end{bmatrix} = \begin{bmatrix} p_{INS\_E} \\ p_{INS\_N} \\ p_{INS\_U} \end{bmatrix} - \begin{bmatrix} \delta p'_E \\ \delta p'_N \\ \delta p'_U \end{bmatrix} \quad (7)$$

$$\begin{bmatrix} v_E \\ v_N \\ v_U \end{bmatrix} = \begin{bmatrix} v_{INS\_E} \\ v_{INS\_N} \\ v_{INS\_U} \end{bmatrix} - \begin{bmatrix} \delta v'_E \\ \delta v'_N \\ \delta v'_U \end{bmatrix} \quad (8)$$

Wherein, $p_E$, $p_N$, and $p_U$ respectively represent an east position, a north position, and a normal position of the vehicle after correction, $p_{INS\_E}$, $p_{INS\_N}$, and $p_{INS\_U}$ respectively represent an east position, a north position, and a normal position of the vehicle calculated by INS.

$\delta p_E'$, $\delta p_N'$, and $\delta p^{U\prime}$ respectively represent components of position error correction values of δp' in the east position, the north position, and the normal position.

$v_E$, $v_N$, and $v_U$ respectively represent an east velocity, a north velocity, and a normal velocity of the vehicle after correction, and $v_{INS\_E}$, $v_{INS\_N}$, and $v_{INS\_U}$ respectively represent an east velocity, a north velocity, and a normal velocity of the vehicle calculated by INS.

$\delta v_E'$, $\delta v_N'$, and $\delta v_U'$ respectively represent components of velocity error correction values of δv' in the east position, the north position, and the normal position.

Due to the fact that in the method of the present disclosure, Velocity is a directly observable quantity, while position is a non-directly observable quantity, such that filtering has high reliability in correcting velocity errors. Due to the fact that the position is obtained through indirect observation, if the random error modeling is not accurate, there will inevitably be errors in the calculation of the position.

The position increment at time k+1 is calculated using the position and the velocity at time k:

$$\begin{bmatrix} p'_{E,k+1} \\ p'_{N,k+1} \\ p'_{U,k+1} \end{bmatrix} = \begin{bmatrix} p_{E,k} \\ p_{N,k} \\ p_{U,k} \end{bmatrix} + \begin{bmatrix} v_{E,k} \\ v_{N,k} \\ v_{U,k} \end{bmatrix} \cdot dt \quad (9)$$

In the formula, dt is a time interval for IMU sampling. $p_{E,k}$, $p_{N,k}$, and $p_{U,k}$ respectively represent an east position, a north position, and a normal position of the vehicle at time k, while $p'_{E,k+1}$, $p'_{N,k+1}$, and $p'_{U,k+1}$ represent an east position, a north position, and a normal position of the vehicle at time k+1 after recalculation.

According to the above formula (9), the position of GNSS at the time of loss of lock is determined, so as to obtain the navigation positioning results. And after filtering is completed, full closure correction is performed on the zero bias estimation of the inertial device until GNSS returns to normal operation.

The present disclosure aims to address the technical problem of positioning error divergence in low-cost GNSS/INS integrated navigation system due to insufficient satellite visibility or strong multipath effects in GNSS denial environments. A method combining motion constraint algorithm and neural network algorithm is proposed for robustness, and complementary advantages are achieved by combining motion constraint algorithm and neural network algorithm, which effectively improves the positioning accuracy and reliability of the integrated navigation system after GNSS losing lock.

Figure 2:
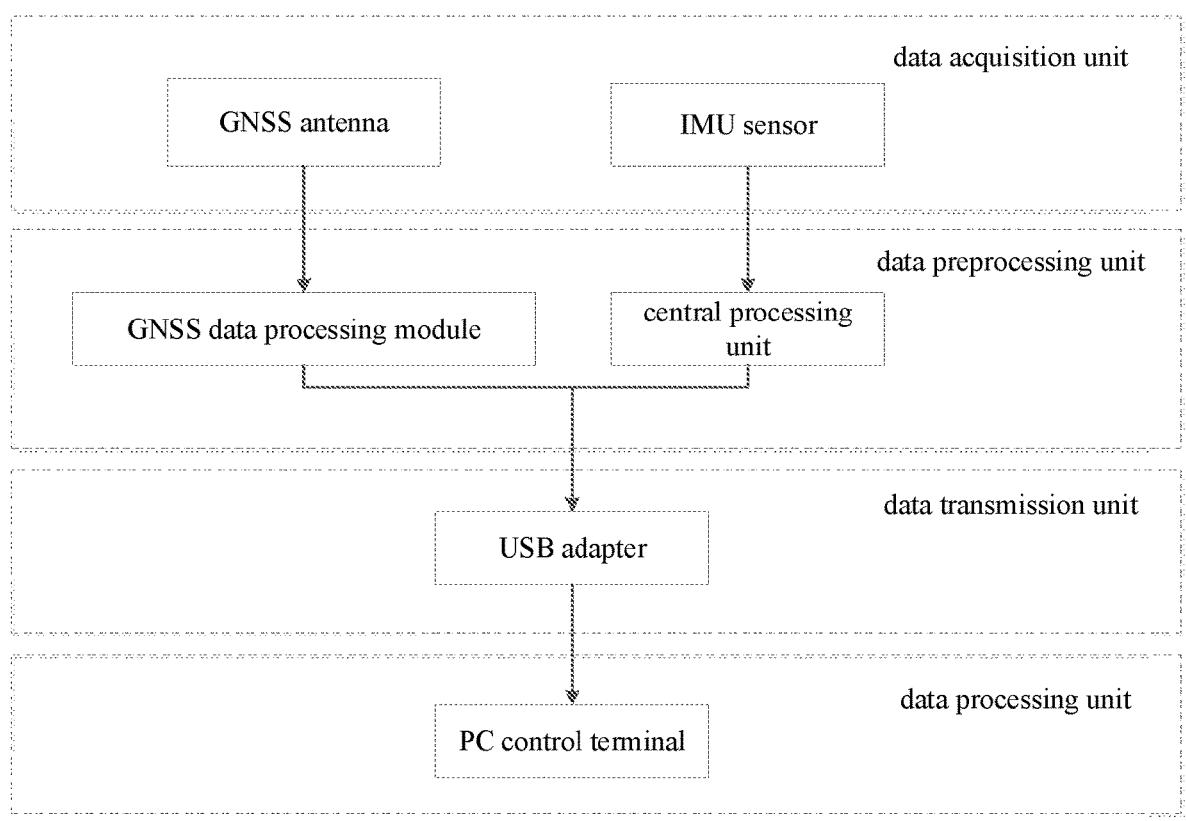
FIG. 2 is the structural block diagram of the GNSS and INS integrated navigation positioning system in the embodiment of the present disclosure.

Besides, a GNSS and INS integrated navigation positioning system is provided by the present disclosure, as shown in FIG. 2. This system includes a GNSS antenna, a GNSS data processing module, an IMU sensor, a central processing unit, and a PC control terminal.

Wherein, the GNSS antenna is connected to the GNSS data processing module, the GNSS antenna is configured to receive the observation data of GNSS satellite, and the GNSS data processing module is configured for preprocessing GNSS antenna observation data.

In this embodiment, the GNSS data processing module, for example, uses the M8 Receiver chip produced by U-blox company.

The IMU sensor is connected to the central processing unit. The IMU sensor is configured to receive the measurement data of gyroscope and accelerometer, i.e. INS data. The central processing unit is configured for preliminary preprocessing of the measurement data of gyroscope and accelerometer.

In this embodiment, the IMU sensor can use a low-cost MEMS inertial measurement unit MPU9250, which integrates a 3-axis gyroscope and a 3-axis accelerometer internally to receive measurement data from the gyroscope and accelerometer.

The GNSS data processing module and the central processing unit are respectively connected to the PC control terminal, for example, a USB adapter.

The USB adapter is used for data and command transmission, transmitting the preprocessed data from the GNSS data processing module and the central processing unit to the PC control terminal and transmitting the instructions from the PC control terminal to the GNSS data processing module and the central processing unit.

The function of the PC control terminal is to store the GNSS data preprocessed by the GNSS data processing module and the INS data preprocessed by the central processing unit, and to solve the measurement data and output the positioning results in real time.

Specifically, the PC control terminal includes a memory and one or more processors. The memory stores an executable code, and the processor executes the executable code for implementing the steps the GNSS and INS integrated navigation positioning method.

Through the steps of GNSS and INS integrated navigation positioning, the measurement data is calculated and the positioning results are output in real time.

In addition, the PC control terminal can send instructions to control the data collection process and data preprocessing process.

By combining the motion constraint algorithm and the BP neural network algorithm to complement the advantages of each other, the present disclosure effectively improves the positioning accuracy and reliability of the combined GNSS and INS navigation system after the GNSS is out of lock.

The above are merely preferred embodiments of the present invention and are not intended to limit the present invention. The present invention may be subject to changes and variations for those skilled in the art. Any modifications, equivalent replacements, and improvements made within the spirit and principles of the present invention shall all be encompassed in the protection scope of the present invention.

What is claimed is:

1. A GNSS and INS integrated navigation positioning method, which is executed by a global navigation satellite system (GNSS) and inertial navigation system (INS) integrated navigation positioning system, comprising a GNSS antenna, a GNSS data processing module, an inertial measurement unit (IMU) sensor, a central processing unit, and a personal computer (PC) control terminal;
   wherein the GNSS antenna is connected to the GNSS data processing module, and the IMU sensor is connected to the central processing unit; the GNSS data processing module and the central processing unit are respectively connected to the PC control terminal; the PC control terminal comprises a memory and one or more processors; the memory stores an executable code, and the processor executes the executable code for implementing the steps of the GNSS and INS integrated navigation positioning method;
   characterized in that, the method comprises the following steps:

constructing a back propagation (BP) neural network, using forward velocities of vehicles within one window period and heading angular velocities measured by the IMU sensor during a normal combination calculation of the GNSS and INS integrated navigation system as an input to the BP neural network, and using transverse velocities of the vehicles within one window period as an output of the BP neural network to train the constructed BP neural network, so as to obtain a trained BP neural network at an end of training;

using the trained BP neural network during losing lock of the GNSS to predict a transverse velocity of a vehicle to be predicted at a current time based on a forward velocity instantaneously calculated by the INS and a heading angular velocity measured by the IMU sensor;

providing a transverse velocity constraint formula for a corresponding motion state based on a current motion state of the vehicle, applying constraints to a predicted transverse velocity of the vehicle to obtain a constrained transverse velocity, and taking the constrained transverse velocity as a velocity observation value in an odometer/nonholonomic constraint, combing with the forward velocity and elevation velocity constraints of the odometer to form a three-dimensional velocity observation vector;

using the velocity observation value in the odometer/the nonholonomic constraint as an auxiliary source with errors input to a Kalman filter, and inputting an INS measured velocity to the Kalman filter, wherein an odometer/nonholonomic constrained velocity is used as a measurement vector, and the INS measured velocity is used as a state vector; conducting a measurement update process of extended Kalman filtering based on the odometer/the nonholonomic constraint;

obtaining an error correction value of the velocity after filtering is completed, correcting a velocity error to obtain a corrected three-dimensional velocity; finally updating a position error by using of the corrected three-dimensional velocity to obtain navigation positioning results.

2. The GNSS and INS integrated navigation positioning method according to claim 1, wherein the forward velocity and the heading angular velocity vectors of the vehicle calculated by the GNSS and INS integrated navigation system within one window period are used as input layer data of the BP neural network, and the transverse velocity of the vehicle within one window period is used as output layer data of the BP neural network;
   wherein the input layer data of the BP neural network is shown in formula (1):

$$x_{input} = \begin{bmatrix} v_{y,1}^b & w_{z,1} \\ \cdots & \cdots \\ v_{y,n-1}^b & w_{z,n-1} \\ v_{y,n}^b & w_{z,n} \end{bmatrix} \quad (1)$$

in the formula, $x_{input}$ is an input of the BP neural network; $x_{input}$ contains the forward velocity $v_{y,i}^b$ of the vehicle and the heading angular velocity $\omega_{z,i}$ within one window period, i represents a solution time of the GNSS and INS integrated navigation system, i=[1,n], n represents the n-th solution time;

wherein, the output layer data of the BP neural network is shown in formula (2):

$$y_{output} = \begin{bmatrix} v_{x,1}^b \\ \cdots \\ v_{x,n-1}^b \\ v_{x,n}^b \end{bmatrix} \quad (2)$$

in the formula, $y_{output}$ is an output of the BP neural network, containing the transverse velocity of the vehicle within one window period;

parameters of the BP neural network are set as follows: a number of a hidden layer is 2, a maximum number of training iterations is 300, an initial learning rate is 0.01, and a training method adopts gradient descent method; a training process of the BP neural network is as follows:

$x_{input}$ is the input of the BP neural network, the forward velocity of the vehicle and the heading angular velocity of the vehicle at the i-th solution time, giving weight values and bias terms from an input layer to the hidden layer and from the hidden layer to an output layer;

during the training process, the forward velocity and the heading angular velocity of the vehicle are used as input values of the hidden layer, multiplied by weight values from the input layer to the hidden layer at time i respectively, and bias terms are added to obtain intermediate variables of the hidden layer;

values obtain from the intermediate variables of the hidden layer calculated by an excitation function are used as output values of the hidden layer;

output values calculated from the forward velocity and the heading angular velocity of the vehicle are used as input values of the output layer, multiplied by weight values from the hidden layer to the output layer at time i, and bias terms from the hidden layer to the output layer are added to obtain intermediate variables of the output layer;

using the value $y_{output}$ calculated by the excitation function of the intermediate variables of the output layer as output values of the BP neural network.

3. The GNSS and INS integrated navigation positioning method according to claim 1, wherein during GNSS losing lock, the heading angular velocity of the vehicle measured by IMU and the forward velocity of the vehicle calculated by INS are substituted into the trained BP neural network to predict a pseudo measured value $\hat{v}_x^b$ of the transverse velocity of the vehicle at the current time;

combining the pseudo measured value of the predicted transverse velocity of the vehicle with the forward velocity and the elevation velocity constraints of the odometer to form a three-dimensional velocity observation vector $[\hat{v}_x^b \ v_{od} \ 0]$, wherein $v_{od}$ represents the forward velocity output by the vehicle;

the observation vector $v_{od/nhc}^b = [\delta_x^b \ v_{od} \ \delta_z^b]^T$ of the odometer/nonholonomic constraint (OD/NHC) is rewritten as:

$$v_{od/nhc}^b = \begin{bmatrix} \hat{v}_x^b & v_{od} & \delta_z^b \end{bmatrix}^T \quad (3)$$

in the formula, $v_{od/nhc}^b$ is a velocity of the vehicle when using the OD/NHC algorithm; $\delta_x^b$ and $\delta_z^b$ are a transverse velocity observation error and a normal velocity observation error of the measured values of sensors installed on the vehicle in a vehicle coordinate system, respectively;

determining the current motion state of the vehicle, providing corresponding transverse velocity constraint formulas based on the corresponding motion state of the vehicle, then, applying constraints to the transverse velocity predicted by the BP neural network;

using a value of the transverse velocity of the vehicle as the velocity observation value $\hat{v}_x^b$ in the odometer/nonholonomic constraint formula (3) for extended Kalman filtering update after obtaining the value of the transverse velocity of the vehicle after the constraint is applied;

obtaining error correction values $\delta p'$ and $\delta v'$ of position and velocity of the vehicle at the time of GNSS losing lock after filtering is completed;

the position and the velocity in navigation results are obtained by the following methods:

$$\begin{bmatrix} p_E \\ p_N \\ p_U \end{bmatrix} = \begin{bmatrix} p_{INS\_E} \\ p_{INS\_N} \\ p_{INS\_U} \end{bmatrix} - \begin{bmatrix} \delta p'_E \\ \delta p'_N \\ \delta p'_U \end{bmatrix} \quad (4)$$

$$\begin{bmatrix} v_E \\ v_N \\ v_U \end{bmatrix} = \begin{bmatrix} v_{INS\_E} \\ v_{INS\_N} \\ v_{INS\_U} \end{bmatrix} - \begin{bmatrix} \delta v'_E \\ \delta v'_N \\ \delta v'_U \end{bmatrix} \quad (5)$$

wherein, $p_E$, $p_N$, and $p_U$ respectively represent an east position, a north position, and a normal position of the vehicle after correction, $p_{INS\_E}$, $p_{INS\_N}$, and $p_{INS\_U}$ represents an east position, a north position, and a normal position of the vehicle calculated by INS;

$\delta p_E'$, $\delta p_N'$, and $\delta p_U'$ respectively represent components of position error correction values of $\delta p'$ in the east position, the north position, and the normal position;

$v_E$, $v_N$, and $v_U$ respectively represent an east velocity, a north velocity, and a normal velocity of the vehicle after correction, and $v_{INS\_E}$, $v_{INS\_N}$, and $v_{INS\_U}$ respectively represent an east velocity, a north velocity, and a normal velocity of the vehicle calculated by INS;

$\delta v_E'$, $\delta v_N'$, and $\delta v_U'$ respectively represent components of velocity error correction values of $\delta v'$ in the east position, the north position, and the normal position;

calculating a position increment at time k+1 using the position and the velocity at time k:

$$\begin{bmatrix} p'_{E,k+1} \\ p'_{N,k+1} \\ p'_{U,k+1} \end{bmatrix} = \begin{bmatrix} p_{E,k} \\ p_{N,k} \\ p_{U,k} \end{bmatrix} + \begin{bmatrix} v_{E,k} \\ v_{N,k} \\ v_{U,k} \end{bmatrix} \cdot dt \quad (6)$$

in the formula, dt is a time interval for IMU sampling;

$p_{E,k}$, $p_{N,k}$, and $p_{U,k}$ respectively represent an east position, a north position, and a normal position of the vehicle at time k, while $p'_{E,k+1}$, $p'_{N,k+1}$, and $p'_{U,k+1}$ represent an east position, a north position, and a normal position of the vehicle at time k+1 after recalculation.

4. The GNSS and INS integrated navigation positioning method according to claim 3, wherein if the vehicle is determined to be traveling straight, a constraint formula of the transverse velocity of the vehicle is as follows:

$$\begin{cases} \hat{v}_x^b = \tilde{v}_x^b, \ \tilde{v}_x^b \leq 3\delta_x^b \\ \hat{v}_x^b = 3\delta_x^b, \ \tilde{v}_x^b > 3\delta_x^b \end{cases} \quad (7)$$

if the vehicle is determined to be turning, a constraint formula of the transverse velocity of the vehicle is as follows:

$$\begin{cases} \hat{v}_x^b = \hat{v}_x^b, \hat{v}_x^b \leq 6\delta_x^b \\ \hat{v}_x^b = 6\delta_x^b, \hat{v}_x^b > 6\delta_x^b \end{cases} \quad (8)$$

5. The GNSS and INS integrated navigation positioning method according to claim 3, wherein if a following formula (9) is met, the vehicle is determined to be turning, otherwise it is determined to be going straight;

$$\begin{cases} \omega_z > \lambda_1, v_y^b \leq v_1 \\ \omega_z > \lambda_2, v_1 < v_y^b \leq v_2 \\ \omega_z > \lambda_3, v_2 < v_y^b \leq v_3 \\ \omega_z > \lambda_4, v_3 < v_y^b \end{cases} \quad (9)$$

In the formula, $\omega_z$ is the heading angular velocity of the vehicle, and $v_y^b$ is the forward velocity of the vehicle;
$\lambda_j$ is an angular velocity change threshold, j=[1,4], and the number 4 in the value of j represents four set of the angular velocity change thresholds;
$v_t$ is an forward velocity change threshold, t=[1,3], and the number 3 in the value of t represents three set of the forward velocity change thresholds.

6. A GNSS and INS integrated navigation positioning system, comprising a GNSS antenna, a GNSS data processing module, an IMU sensor, a central processing unit, and a PC control terminal;
wherein, the GNSS antenna is connected to the GNSS data processing module, and the IMU sensor is connected to the central processing unit;
the GNSS data processing module and the central processing unit are respectively connected to the PC control terminal;
the PC control terminal comprises a memory and one or more processors;
the memory stores an executable code, and the processor executes the executable code for implementing the steps the GNSS and INS integrated navigation positioning method;

constructing a back propagation (BP) neural network, using forward velocities of vehicles within one window period and heading angular velocities measured by the IMU sensor during a normal combination calculation of the GNSS and INS integrated navigation system as an input to the BP neural network, and using transverse velocities of the vehicles within one window period as an output of the BP neural network to train the constructed BP neural network, so as to obtain a trained BP neural network at an end of training;
using the trained BP neural network during losing lock of the GNSS to predict a transverse velocity of a vehicle to be predicted at a current time based on a forward velocity instantaneously calculated by the INS and a heading angular velocity measured by the IMU sensor;
providing a transverse velocity constraint formula for a corresponding motion state based on a current motion state of the vehicle, applying constraints to a predicted transverse velocity of the vehicle to obtain a constrained transverse velocity, and taking the constrained transverse velocity as a velocity observation value in an odometer/nonholonomic constraint, combing with the forward velocity and elevation velocity constraints of the odometer to form a three-dimensional velocity observation vector;
using the velocity observation value in the odometer/the nonholonomic constraint as an auxiliary source with errors input to a Kalman filter, and inputting an INS measured velocity to the Kalman filter, wherein an odometer/nonholonomic constrained velocity is used as a measurement vector, and the INS measured velocity is used as a state vector; conducting a measurement update process of extended Kalman filtering based on the odometer/the nonholonomic constraint;
obtaining an error correction value of the velocity after filtering is completed, correcting a velocity error to obtain a corrected three-dimensional velocity; finally updating a position error by using of the corrected three-dimensional velocity to obtain navigation positioning results.

* * * * *